United States Patent
Bein (10) Patent No.: US 11,609,981 B1
(45) Date of Patent: Mar. 21, 2023

(54) GFI TRIPPED CIRCUIT DETECTION AND WIRELESS NOTIFICATION SYSTEMS AND METHODS

(71) Applicant: Moon River Investments, LLC, Sedona, AZ (US)

(72) Inventor: George Bein, Sedona, AZ (US)

(73) Assignee: MOON RIVER INVESTMENTS, LLC, Sedona, AZ (US)

( * ) Notice: Subject to any disclaimer, the term of this patent is extended or adjusted under 35 U.S.C. 154(b) by 0 days.

(21) Appl. No.: 18/059,771

(22) Filed: Nov. 29, 2022

Related U.S. Application Data (63) Continuation of application No. 17/067,260, filed on Oct. 9, 2020, now Pat. No. 11,537,703.

(60) Provisional application No. 63/042,127, filed on Jun. 22, 2020, provisional application No. 62/914,247, filed on Oct. 11, 2019.

(51) Int. Cl.
| | |
|---|---|
| *G06F 21/44* | (2013.01) |
| *G06F 1/26* | (2006.01) |
| *G06F 13/10* | (2006.01) |
| *G08B 5/36* | (2006.01) |
| *H04L 51/52* | (2022.01) |
| *H04L 51/224* | (2022.01) |

(52) U.S. Cl.
CPC .............. *G06F 21/44* (2013.01); *G06F 1/26* (2013.01); *G06F 13/10* (2013.01); *G08B 5/36* (2013.01); *H04L 51/224* (2022.05); *H04L 51/52* (2022.05); *G06F 2213/40* (2013.01)

(58) Field of Classification Search
CPC . G06F 21/44; G06F 1/26; G06F 13/10; G06F 2213/40; G06F 1/30; G06F 1/28; G06F 21/81; G08B 5/36; G08B 29/181; H04L 51/224; H04L 51/52; H04L 51/02
USPC .................. 340/1.22, 7.44, 7.51; 726/17
See application file for complete search history.

(56) References Cited

U.S. PATENT DOCUMENTS

| | | | | |
|---|---|---|---|---|
| 7,055,046 | B2 * | 5/2006 | Malueg | G06F 1/3203 |
| | | | | 713/320 |
| 7,557,330 | B2 * | 7/2009 | Shearer | F24D 19/1096 |
| | | | | 361/45 |
| 9,007,186 | B1 * | 4/2015 | Krummey | G06Q 50/06 |
| | | | | 340/12.32 |
| 9,331,524 | B1 * | 5/2016 | Yetter | H02J 13/0005 |
| 9,941,647 | B2 * | 4/2018 | Huang | H01R 25/006 |
| 10,341,828 | B1 * | 7/2019 | Bein | H04L 67/12 |
| 10,615,588 | B2 * | 4/2020 | Li | H01H 9/54 |
| 10,622,770 | B2 * | 4/2020 | Parks | H02J 13/00007 |
| 10,680,433 | B2 * | 6/2020 | Wilson | H04L 43/16 |
| 10,839,281 | B2 * | 11/2020 | Awheda | H02J 13/00026 |
| 11,537,703 | B2 * | 12/2022 | Bein | G06F 1/30 |

(Continued)

FOREIGN PATENT DOCUMENTS

| | | | | |
|---|---|---|---|---|
| WO | WO-2021112870 A1 * | 6/2021 | | G01R 31/3277 |

*Primary Examiner* — Nam V Nguyen
(74) *Attorney, Agent, or Firm* — Snell & Wilmer L.L.P.

(57) ABSTRACT

Systems and methods for ground fault circuit interrupter trip detection and entire premises loss of power and restoration detection and notification of those events is disclosed. An example system may receive a smart plug identification. The system may authorize a smart plug. The system may link the smart plug to a smart plug application. The system may query the smart plug to obtain a power notification. The system may notify smart plug application of a power status.

20 Claims, 3 Drawing Sheets

(56) References Cited

U.S. PATENT DOCUMENTS

| | | | |
|---|---|---|---|
| 2005/0093708 A1* | 5/2005 | Dupeire | H02G 1/00 |
| | | | 340/664 |
| 2010/0079001 A1* | 4/2010 | Lee | H01R 13/7038 |
| | | | 307/40 |
| 2010/0152912 A1* | 6/2010 | Huang | G06F 1/266 |
| | | | 700/295 |
| 2016/0218509 A1* | 7/2016 | Paul | H02J 3/14 |
| 2016/0370833 A1* | 12/2016 | Lu | G06F 1/28 |
| 2017/0025892 A1* | 1/2017 | Van Ostrand | H02H 1/04 |
| 2020/0067245 A1* | 2/2020 | Maley | H01R 13/516 |

* cited by examiner

GFI TRIPPED CIRCUIT DETECTION AND WIRELESS NOTIFICATION SYSTEMS AND METHODS

CROSS-REFERENCE TO RELATED APPLICATIONS

This application is a continuation application claiming priority from U.S. patent application Ser. No. 17/067,260 filed Oct. 9, 2020, now U.S. Pat. No. 11,537,703, titled "GFI TRIPPED CIRCUIT DETECTION AND WIRELESS NOTIFICATION SYSTEMS AND METHODS." U.S. patent application Ser. No. 17/067,260 claims priority to, and the benefit of, U.S. Provisional Application No. 63/042,127 titled "GFI TRIPPED CIRCUIT DETECTION AND WIRELESS NOTIFICATION SYSTEMS AND METHODS" filed on Jun. 22, 2020 and claims priority to, and the benefit of, U.S. Provisional Application No. 62/914,247 titled "GFI TRIPPED CIRCUIT DETECTION AND WIRELESS NOTIFICATION SYSTEMS AND METHODS" filed on Oct. 11, 2019. The aforementioned applications are incorporated herein by reference in their entirety for all purposes.

FIELD

The present disclosure relates to detection and notification systems for ground fault circuit interrupters ("GFCI's" or sometimes referred to as GFI circuits), and more specifically, to systems and methods for communicating a loss of power to devices plugged into GFI protected electrical circuits through use of smart plugs. In addition, the detection and notification system to be described will communicate the loss of power to an entire property based upon the loss of power to a smart plug plugged into any electrical outlet on the premises, not only to a power loss due to the tripping of a particular GFI protected circuit.

BACKGROUND

Users may visually detect ground fault interrupter ("GFI") circuit trips in homes and/or businesses. For example, a user may detect GFI circuit trips by personally viewing that a device, such a refrigerator or a lamp, is powered off when other devices connected to a different GFI circuit are powered on. Some GFI circuits may have an indicator light that illuminates to indicate either that the GFI circuit has tripped or that it has not tripped. Accordingly, the user may detect GFI circuit trips by personally viewing the indicator light.

Smart plugs incorporating "Internet of Things" technology may provide users with options to turn devices on and to turn devices off. Such smart plugs may also create power usage schedules for devices connected to the smart plug and/or estimate energy usage of devices connected to the smart plug. Nevertheless, there are many situations where individuals may be unaware of when a GFI circuit trips, e.g., when the user is not able to view the indicator light or does not observe any devices connected to the GFI circuit to determine that such devices are unexpectedly not receiving power. In one specific example, a user may be far away from the premises of the devices, and may not be aware that a freezer or aquarium connected to a GFI circuit has lost power, due to a GFI circuit trip, until it is too late to take remedial action. Also, in many parts of the country, there are blackouts causing total loss of power to one's premises. Or, occasionally, a power transformer can fail resulting in total power loss. Individuals would want to know about these events, especially when they are away from the premises, so that some remedial action can be taken, depending upon the circumstances. Thus, there is a need for improved methods of notifying individuals of GFI circuit trips.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Systems and methods for GFI tripped circuit detection and notification are described. The systems and methods use a smart plug and a custom-written Application, known as GFI Notify. The smart plug and GFI Notify application work together to provide the detection of the loss and restoration of electrical power and the notification of such loss and restoration to the user. The systems and methods apply to the loss of power and restoration of power to an entire house, not only to a GFI monitored circuit.

A method may include receiving a smart plug identification and authorizing the smart plug. The method may include linking the smart plug to a smart plug application and querying the smart plug to obtain a power notification. The method may include receiving the power notification and notifying the smart plug application of a power status.

A system may include a processor and a memory coupled to the processor. The memory may have instructions causing the processor to receive a smart plug identification from a smart plug. The system may receive a smart plug identification from a smart plug and authorize the smart plug. The system may link the smart plug to a smart plug application and query the smart plug to obtain a power notification. The system may receive the power notification and notify the smart plug application of a power status. The application may query the plug from time to time to determine if the plug has loss of power. The system may communicate using Z-Wave, ZigBee, WiFi, Bluetooth or any such radio frequency and protocol.

The foregoing features and elements may be combined in various combinations without exclusivity unless expressly indicated herein otherwise. These features and elements, as well as the operation of the disclosed embodiments, will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

A technical problem solved by this disclosure is that existing GFI circuits, and even smart plugs connected thereto, do not have the ability to transmit a notification to an individual, immediately, when GFI circuits trip. Therefore, damage, harm, and/or loss may occur before an individual is aware of the GFI circuit trip and is able to take remedial action. The same damage, harm and/or loss may also occur if power is lost to the entire premises due to a cause other than the tripping of a GFI outlet. Therefore, in everything that follows, when referring to loss of power due to the tripping of a GFI outlet, we intend to include the loss of power to any electrical outlet on the premises, including non-GFI outlets.

In an example embodiment of the present disclosure, a system and method enable detection of and notification of GFI circuit trips, thus facilitating remedial action (and preventing losses, such as loss of refrigerated and/or frozen food, loss of fish in heated/filtered fish tanks, loss of power to external security systems, loss of power to heaters in greenhouses, and any other potential losses due to GFI circuit trips.) In various embodiments, a GFI circuit trip notification system comprises a GFI Notify application. In an example embodiment, the GFI Notify application runs on a smart cloud server. The GFI Notify application is configured to communicate with a smart plug that is plugged into a GFI circuit. The GFI Notify application is configured to detect the trip of the GFI circuit, and to provide notification to one or more individuals upon detection of such a trip. Notifications can be provided to the individuals via text, phone call, social media channels, email, notifications to an application on a mobile device, or any other suitable communication system. In an example embodiment, the GFI Notify application is configured to allow users to register an account and to associate one or more smart plugs with the account. The GFI Notify application is associated with the GFI Notify™ trademark.

In an example embodiment, a user may purchase a smart plug. The smart plug may be any suitable smart plug, as described below. The user may plug the smart plug into any outlet associated with a particular GFI circuit. The user may follow normal manufacturer procedures to set up and operate that smart plug. In an example embodiment, the user may establish a GFI Notify account, select desired notification options, and link the GFI Notify account to the particular smart plug. From here, the GFI Notify application can detect a trip of the GFI circuit associated with that smart plug, and provide a notification to the user of that trip. When each smart plug is installed, the user may label each smart plug (e.g., "GFI Garage" as one smart plug that plugs into a GFI circuit, and "Hallway" as a plug that plugs into a non-GFI outlet). The user may plug one plug into the GFI circuit, and another plug into a non-GFI outlet. If the user's entire home loses power, as well as when the user's home regains power, notifications from the GFI Notify application may report the power outage to both plugs by the names given to each plug by the user. These example systems and methods are further described herein.

Figure 1:
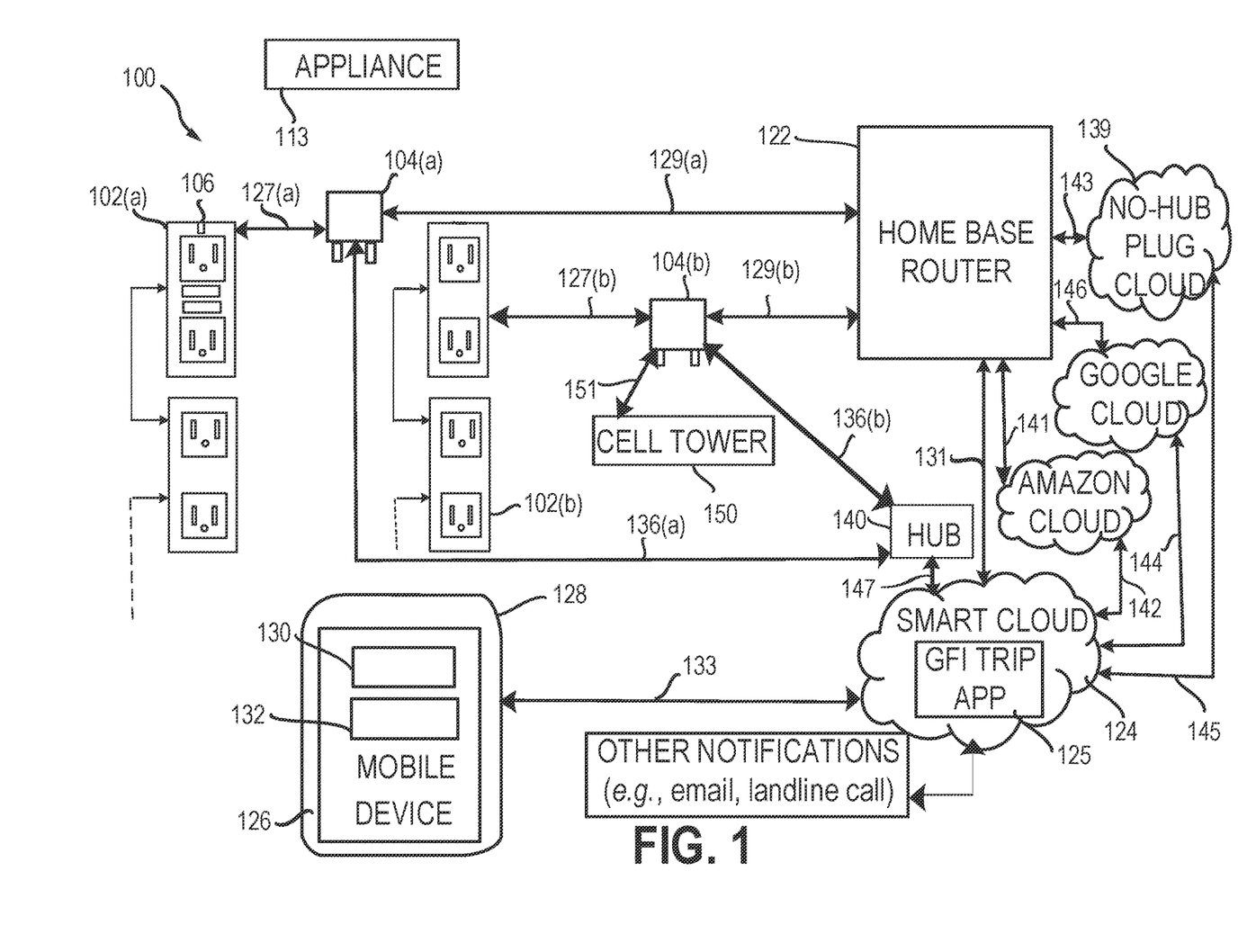
FIG. 1 illustrates a block diagram for a method of a GFI tripped circuit detection and entire premise power loss and restoration detection and notification of such events, in accordance with various embodiments.

With reference now to FIG. 1, an example GFI circuit trip detection and notification system 100 is disclosed. The GFI circuit trip detection and notification system 100 may comprise a smart cloud server 124. The smart cloud server 124 may be configured to operate a GFI Notify application 125. The smart cloud server 124 may be configured to communicate with a smart plug 104(a) or 104(b) (e.g., Amazon Echo, Google Home, etc.).

In an example embodiment, the smart plug 104(a) or 104(b) may be any suitable smart plug that communicates data with a remote device. For example, the smart plug 104(a) or 104(b) may be a Belkin WeMo Insight Smart Plug, an iHome Isp6x SmartPlug, a Geeni Spot Smart Wi-Fi Plug, or any suitable smart plug. For example, the smart plug 104(a) or 104(b) (e.g., GE Enbrighten, Sylvania Smart, Sengled Smart Plug, Jasco Z-Wave Plus, Leviton, Honeywell Z-Wave Plus, Innr Zigbee Smart Plug, etc.) may communicate using a first wireless communications protocol 129 (a) or 129(b) and a second wireless communications protocol 136(a) or 136(b) (e.g., Z-Wave, Zigbee, etc.) with a hub 140 (e.g., SmartThings, Wink Hub, Insteon Hub from Insteon, Harmony by Logitech, Almond by Securifi, VeraLite by Vera, etc.) and smart cloud server 124. In a further example, the smart plug 104(a) or 104(b) may communicate via Wi-Fi connection 129(a) or 129(b) to home base router 122 and smart cloud server 124 (e.g., Amazon Echo, Google Home, Etckcity Smart Plug, Netvip, KMC WiFi Mini, etc.). The smart plug 104(a) or 104(b) may comprise power sockets, socket pins, capacitors, coils, and or rectifiers. The smart plug 104(a) or 104(b) may also comprise a controller, a microprocessor, and/or a memory. The smart plug 104(a) or 104(b) may be an Internet of Things (IoT) device, which may include a physical device embedded with Internet connectivity that may be controlled and/or viewed remotely with a mobile device 126. Smart plug 104(a) or 104(b) may communicate by wire or wirelessly via Wi-Fi, Bluetooth®, and LAN. Smart plug 104(a) or 104(b) may comprise an antenna.

The smart plug 104(a) or 104(b) may be plugged 127(a) or 127(b) into an electrical outlet 102(a) or 102(b). In various example embodiments, the electrical outlet 102(a) or 102(b) is a two prong outlet ("Type A") as used in the United States. In another example embodiment, the electrical outlet is a three prong outlet ("Type B") as also used in the United States. In another example embodiment, the electrical outlet is a two prong outlet ("Type C" or "Europlug") as used in Europe. In another example embodiment, the electrical outlet is a three prong outlet ("Type D") as used in India and Nepal. Moreover, the electrical outlet can be any suitable outlet type consistent with the standards of the relevant country/jurisdiction. Smart plug 104(a) or 104(b) may be configured to receive power from electrical outlet 102(a) or 102(b).

The electrical outlet 102(a), in an example embodiment, is a GFI outlet. In another example embodiment, the outlet 102(a) is part of a GFIC protected electrical circuit. Although these smart plugs may be configured to plug into any standard electrical outlet, in a particular example embodiment, the smart plug may be plugged into a GFI protected outlet. In an example embodiment, the GFI circuit may be a circuit breaker that installs into an electrical panel. In another example embodiment, the GFI circuit may comprise a circuit breaker inside of an outlet. Moreover, any suitable GFI system may be used herewith.

In an example embodiment, the smart plug 104(a) is thus plugged into any electrical outlet associated with and protected by a particular GFI circuit. In an example embodiment, a connected electric device 113, e.g., an appliance, a freezer, a fish tank, heater, security system, etc., is plugged into any electrical outlet associated with the particular GFI circuit. Thus, the smart plug 104(a) and connected electrical device 113 may be connected to the same GFI circuit, such that a trip of the GFI circuit would cause loss of power to both the smart plug 104(a) and the connected electrical device 113. In one embodiment, the connected electrical device 113 is plugged into the smart plug itself.

In an example embodiment, the smart plug 104(b) is plugged into any electrical outlet that is not associated with a GFI associated circuit. This is represented by 102(b) in FIG. 1. Any electrical device such as a lamp or a heated fish tank can be plugged into smart plug 104(b). The loss of power to the entire premises would cause the loss of power to outlets 102(b) and also to smart plug 104(b). The GFI Notify application 125 will detect that power loss and provide notifications so that appropriate remedial action can be taken.

In an example embodiment, two smart plugs 104(a) and 104(b) are utilized to provide power outage information. The first plug is plugged into GFI circuit outlet 102(a) and the second outlet is plugged into a non-GFI outlet 102(b). If the GFI Notify application 125 detects power outage at both plugs, it is almost certain that means that power has been lost to the entire premises. However, if GFI Notify reports a power loss from the GFI outlet 102(a) and not the non-GFI plug in 102(b), then one can most definitely conclude that only the GFI has tripped. Remedial action can be immediately commenced.

| Power off on both | Power lost in whole house |
| Just GFI | Tripped GFI |

If both plugs provide notifications of a power loss indicating the probable of loss of power to the entire premises and not a GFI trip, the GFI Notify application 125 will also provide notifications when the power to the premises is restored.

Hub and Non-Hub Alternatives

Moreover, the smart plug 104(a) or 104(b) may communicate with the smart cloud server 124 via various communication paths. In one example embodiment, the system 100 further comprises hub 140. Hub 140 may comprise one or more hardware, software, and/or database components. Hub 140 may comprise at least one computing device in the form of a computer or processor, or a set of computers/processors, although other types of computing units or systems may be used. In an example embodiment, hub 140 may connect one or more devices on a home automation network and may control communications among the devices. Hub 140 may connect locally or to smart cloud server 124. Hub 140 may communicate wirelessly or by LAN with smart cloud server 124. Smart plug 104(a) or 104(b) may communicate with a SmartThings-enabled hub 140, followed by the SmartThings Cloud via wireless technologies (e.g., Z-Wave, Zigbee, and an Ethernet controller). Hub 140 may send and receive data from the Z-Wave, Zigbee, and Ethernet controller devices. Some examples of smart plug 104(a) or 104(b) in this category are: GE Enbrighten, Sylvania Smart, Sengled Smart Plug, Jasco Z-Wave Plus, Leviton, Honeywell Z-Wave Plus and Innr Zigbee Smart Plug. In another example embodiment, hub 140 may comprise an IoT hub, which may be a managed service hosted on smart cloud server 124 that may act as a central message hub for bidirectional communication between an IoT application and the devices the IoT hub manages. Hub 140 may be useful for IoT devices that use the Zigbee or Z-Wave protocols, or Bluetooth® (e.g., SmartThings). Further, hub 140 may support communications from both a device to smart cloud server 124 and from smart cloud server 124 to the device.

In an example embodiment, system 100 may further comprise a home network router 122. Home base router 122 may comprise any suitable router configured to facilitate connecting various devices to the internet. Home base router 122 may be configured to communicate wirelessly or by LAN with smart plug 104(a) or 104(b). In an example embodiment, an Amazon Echo smart plug 104(a) or 104(b) may communicate via the home base router 122 to communicate with an Amazon cloud server via wireless communication 141. In another example embodiment, a Google Home smart plug 104(a) or 104(b) may communicate via the home base router 122 to communicate with a Google cloud server via wireless communication 146. The Amazon and Google cloud servers may each communicate with the smart cloud server 124 via wireless communications 142 and 144, respectively. In another example embodiment, a Phillips Hue Bridge smart plug 104(a) or 104(b) may communicate via the home base router 122 to communicate with the hub 140. Hub 140 in turn may communicate with the smart cloud server 124 via wireless communication 147. Although the various cloud servers are identified herein, in general the smart plugs may communicate with the internet via a hub 140 or a home base router 122.

In an example embodiment, a wireless communication 151 may be made through a cellular network from an embedded network SIM card in smart plug 104(b) to a nearby cellular tower 150.

In an example embodiment, the wireless communication is via Wi-Fi to a router located in proximity to the smart plug. In another example embodiment, the wireless communication is via Bluetooth® to a router. Moreover, any suitable communication system between the smart plug and the remote device may be used, to the extent that it facilitates communication between the smart plug and a mobile device that may be located distant from the smart plug. The communication from the smart plug to the mobile device may be via the Internet.

The GFI Notify Application:

In an example embodiment, the GFI Notify application 125 is configured to request and receive smart plug information. For example, the GFI Notify application 125 may send a request to hub 140 requesting smart plug information. In another example embodiment, the GFI Notify application 125 may send a request to smart plug 104(a) or 104(b) via the home base router 122 (and or other cloud servers) requesting smart plug information. In either case, if the GFI Notify application 125 receives no response to the request, then the GFI Notify application 125 may determine that the GFI circuit powering the smart plug has tripped. In an example embodiment, the GFI Notify application 125, or hub 140, may send multiple requests, before determining that the GFI circuit powering the smart plug has tripped.

In an example embodiment, the GFI Notify application 125 is configured to provide GFI tripped circuit notification. Upon determining that the GFI circuit has tripped, the GFI Notify application 125 sends a notification to the user. In an example embodiment, the notification can be sent to a mobile device, computer, telephone, or other remote device. The notification can be provided to a user that is remote from the GFI circuit and connected electrical devices. The notification can be sent to a user that is in the same building as the GFI circuit, but not aware of the GFI circuit trip. In an example embodiment, the notification is sent to the user's mobile device 126 via wireless communication 133 (e.g., text message, phone call, ping notification, email, social media message, etc.). User may then take remedial action.
Mobile Device Thus, in an example embodiment, system 100 further comprises a mobile device 126. The user's mobile device may comprise a personal computer, personal digital assistant, cellular phone, smartphone (e.g., IPHONE®, BLACKBERRY®, and/or the like), IoT device, laptop, tablet, or any other device configured to download the smart plug application. Mobile device 126 may comprise one or more hardware, software, and/or database components capable of sending, receiving, and storing data. Mobile device 126 may comprise an operating system such as, for example, a WINDOWS® mobile operating system, an ANDROID® operating system, APPLE® IOS®, a BLACKBERRY® operating system, a LINUX® operating system, and the like. Mobile device 126 may also comprise software components installed on mobile device 126 and configured to allow via mobile device 126 access to various systems, services, and components in system 100. For example, mobile device 126 may comprise a web browser (e.g., MICROSOFT INTERNET EXPLORER®, GOOGLE CHROME®, etc.), an application, a micro-app or mobile application, and/or the like configured to allow mobile device 126 to access various systems, services, and components in system 100. The mobile device may be configured to run a mobile application and/or web application. In various embodiments, mobile device 126 may include one or more processors. The processor may be configured to implement various logical operations in response to execution of instructions, for example, instructions stored on a non-transitory, tangible, computer-readable medium, as discussed further herein.

In various embodiments, mobile device 126 may comprise a user interface ("UI") 128. UI 128 may be configured to provide an interface configured to enable a user to access and interact with various components of system 100. Mobile device 126 may be in electronic communication with the smart cloud 124 and/or the internet generally. In an example embodiment, mobile device 126 further comprises an application configured to access the GFI Notify application 125 running in the smart cloud 124. In another example embodiment, mobile device 126 is configured to communicate with the GFI Notify application 125 running in the smart cloud 124 via a web browser. Thus, UI 128 may include a graphical user interface ("GUI"), software modules, logic engines, various databases, interfaces to systems and tools, and/or computer networks. UI 128 may comprise a web browser, such as, for example, MICROSOFT INTERNET EXPLORER®, GOOGLE CHROME®, MOZILLA FIREFOX®, and/or any other suitable or desired web browser. In various embodiments, UI 128 may comprise one or more software and/or database components.

In an example embodiment, mobile device 126 may be used to create/register for a GFI Notify account and to adjust settings and preferences associated with that account, as will be described in greater detail herein. In an example embodiment, mobile device 126 may be configured to enable the user to register for a GFI Notify Account. For example, the mobile device 126 may have a GFI Notify application running on the mobile device. In another example embodiment, the mobile device 126 is configured to create/register for a GFI Notify account via a web browser.

In another example embodiment, mobile device 126 may be used to associate a particular smart plug(s) with the GFI Notify account. Stated another way, a user may, via the mobile device 126, subscribe a particular smart plug 104(*a*) or 104(*b*). For example, the GFI Notify application 125 may be configured to receive a unique identification associated with a particular smart plug, and to associate that particular smart plug with that particular GFI Notify account. In one example embodiment, the user may manually input a particular smart plug identification code into the GFI Notify Account set-up on mobile device 126. In a further example, the user may utilize the scanning capability of mobile device 126 to scan a bar code or QR code containing the identification code, and this identification code can be communicated to the GFI Notify application 125. The GFI Notify application 125 can store the unique smart plug identification in connection with the GFI Notify Account.

The GFI Notify application 125 may be further configured to establish a communication link with the identified smart plug. Stated another way, the GFI Notify application 125, running on the smart cloud server 124, may be configured to subscribe to the smart plug 104(*a*) or 104(*b*). A user may pay for and download the GFI Notify application 125 on mobile device 126 from the App Store or Play Store. For example, the smart plug 104(*a*) or 104(*b*) may communicate via first wireless communications protocol 136(*a*) or 136(*b*) with hub 140. After pairing, smart plug 104(*a*) or 104(*b*) may be given a unique name (e.g., GFI Garage) to identify location. The GFI Notify application 125 may communicate with smart plug 104(*a*) or 104(*b*) to determine the names and locations of the smart plug 104(*a*) or 104(*b*). In another example embodiment, the smart plug 104(*a*) or 104(*b*) may communicate via Wi-Fi connection 129(*a*) or 129(*b*) to home base router 122, and to smart cloud server 124 via a second wireless communications protocol 131. In another example embodiment, home base router 122 may communicate with smart cloud server 124 via cloud-to-cloud interaction. For example, home base router 122 may communicate via wireless communication protocol 143 to no-hub plug cloud 139 and/or to smart cloud server 124 via wireless communication protocol 145.

Thus, once an account is established and a smart plug has been identified and a communication link established, then the GFI Notify application 125 can be used to provide notifications of a GFI trip. The method of doing this method is now described in further detail.

Figure 2:
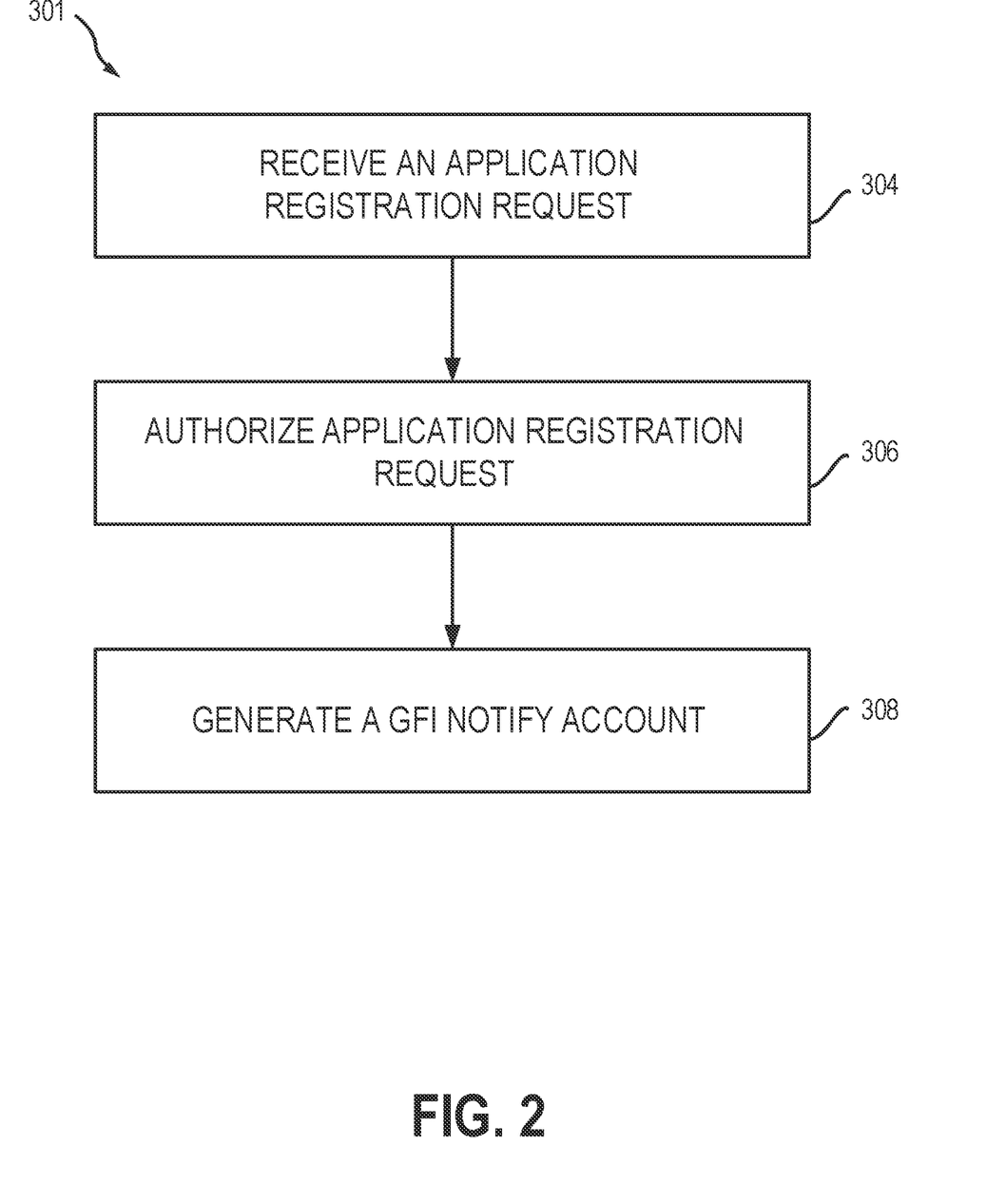
FIG. 2 illustrates a process flow for a method of registering a smart plug with a smart plug application, in accordance with various embodiments.
Figure 3:
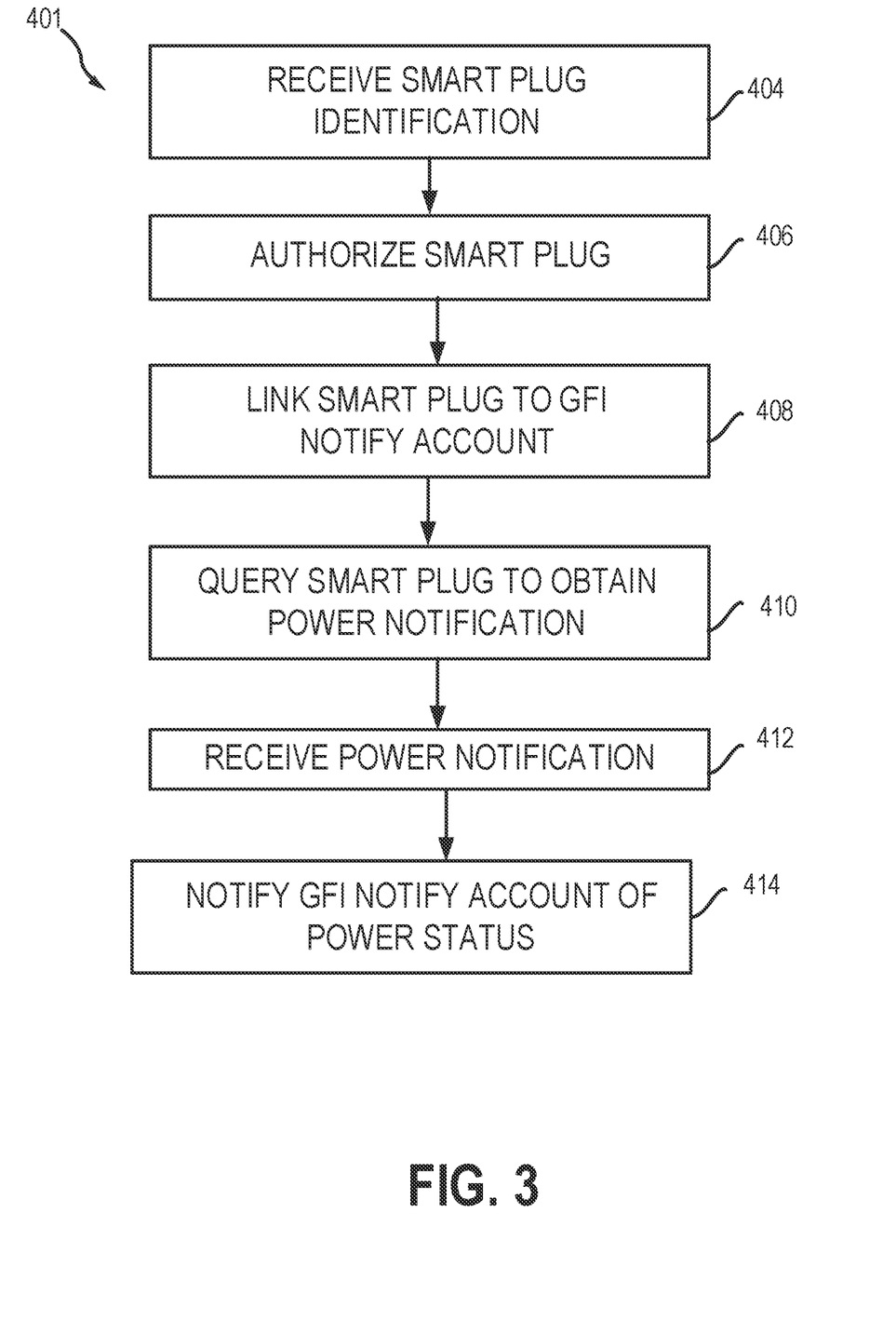
FIG. 3 illustrates a process flow for a method of communicating a GFI tripped circuit from a smart plug, in accordance with various embodiments.

In an example embodiment, the user starts the smart plug application on their smartphone, and follows the set-up procedure. The smart plug application may comprise a user interface displayed on the mobile device. The smart plug application may comprise application programming interfaces (APIs) whereby the user may interact with the smart plug application.
Method FIGS. 2 and 3 illustrate example block diagram methods of GFI tripped circuit detection and notification, in accordance with various embodiments. FIG. 2 illustrates a process flow for a method 301 of creating a GFI Notify Account, in accordance with various embodiments. Method 301 may comprise the GFI Notify application 125 receiving an application registration request (step 304). A user may input data via a UI to generate an application registration request. For example, a user may interact with UI 128 via an application or web browser on a mobile device 126 or on a computer to generate an application registration request. In an example embodiment, the application registration request may be received by the GFI Notify application 125 running on the smart cloud server. The registration request may include user identifying data (e.g., username, password, biometric input, knowledge-based authentication (KBA), etc.), interface data (e.g., the type of browser), and/or the like.

Method 301 may include authorizing the application registration request (step 306). The GFI Notify application 125 may be configured to authorize the application registration request using any suitable technique or process. For example, the GFI Notify application 125 may authorize the application registration request by verifying the user identifying data against stored user data or checking with other databases, determining that the user has authority to submit the request (e.g., based on the verified user identifying data), verifying that UI 128 is supported (e.g., based on the interface data), and/or the like.

Method 301 may include generating a GFI Notify Account (step 308). For example, in response to authorizing the application registration request, the GFI Notify application 125 may create a GFI Notify Account for the user. The GFI Notify application 125 may generate the GFI Notify Account using any suitable process or technique. The newly generated account may comprise a unique identifier identifying the user registering for GFI circuit trip notifications and detection.

In accordance with an example embodiment, the user may provide preferences and adjust settings associated with the user registration and/or with particular smart plug(s). For example, the user may indicate how the user wants to be notified, e.g., by text, push notification, email, phone call, etc., and provide relevant information for such notification, such as a cell phone number, email address, and or the like. In an example embodiment, the user can designate additional individuals to notify and/or require notification through multiple channels to increase the chance that the notifications catch the individual's attention.

In accordance with an example embodiment, the user can add a custom name, or select from a drop down list of common names, of connected electrical device(s) that are plugged into the same GFI circuit as a particular smart plug 104(*a*) or 104(*b*). In this way, the GFI Notify application 125 can not only provide a notice that the GFI circuit has tripped, but also indicate what appliance is therefore without power. This increases the understand-ability where two or more GFI circuits are being monitored by the same individual (whether in the same or a different building).

FIG. 3 illustrates a process flow for a method 401 of communicating a GFI tripped circuit from a smart plug, in accordance with various embodiments. In various embodiments, the method 401 of communicating a GFI tripped circuit from a smart plug is disclosed. Method 401 may include receiving a smart plug identification (step 404). In one example embodiment, this occurs when the GFI Notify application 125 receives a smart plug authentication link request from UI 128. The smart plug authentication link request may comprise an identifier of a smart plug the user wants to register for use in the user's home and/or other building.

In this example embodiment, the smart plug 104(*a*) and 104(*b*) may have an identification code available for the user to input into the smart plug application. The identification code may comprise a numbered code, a QR code, a bar code, an alphanumeric code, and/or any suitable code for identifying a smart plug. The identification code may be input into the smart plug application manually via a user's mobile device 126. The identification code may be located in the package and/or on the smart plug 104(*a*) or 104(*b*). In an example embodiment, the user may read the identification code off of the smart plug package or the smart plug 104(*a*) or 104(*b*) itself and enter it into the GFI Notify application on the mobile device for communicating the code to the GFI Notify application 125. In another example embodiment, mobile device 126 may contain QR code and/or barcode scanner ability, and the smart plug application may contain QR code and/or barcode scanner ability. In this manner, the smart plug application may be configured to scan a QR code and/or bar code on the smart plug 104(*a*) or 104(*b*) or the smart plug packaging, and to communicate the smart plug identification code to the GFI Notify application 125 based on that scan. In another example embodiment, the user inputs the identification code by typing the code into a smart plug webpage running on a desktop computer. However, any suitable method of inputting the identification code into the smart plug application software may be used. In a further example embodiment, the user may use an existing smart plug 104(*a*) or 104(*b*) previously paired to hub 140. The location of smart plug 104(*a*) or 104(*b*) may be determined by hub 140.

Method 401 may include authorizing the smart plug to the GFI Notify Account (step 406). The GFI Notify application 125 may be configured to link the smart plug identification to the GFI Notify Account and to subscribe to the smart plug. The linked smart plug may enable the user to continue to interact with the smart plug without needing to continually login or present user credentials to access the registered smart plug on the GFI Notify Account. (step 408).

Method 401 may include querying smart plug 104(*a*) or 104(*b*) to obtain a power notification (step 410). The GFI Notify application 125 may initiate a periodic querying of smart plug 104(*a*) to obtain data on power status of a GFI circuit associated with GFI outlet 102(*a*). Thereafter, the GFI Notify application 125 may check in with smart plug 104(*a*) periodically. The smart plug data may comprise data the user wants to access for determining if a GFI circuit has tripped. Method 401 may include receiving the power notification (step 412). For example, smart plug 104(*a*) or 104(*b*) may send Simple Device Viewer a status update. Simple Device Viewer may subscribe to status updates from the smart plug 104(*a*) or 104(*b*). If the smart plug 104(*a*) or 104(*b*) does not send an update within a certain time frame, the smart plug 104(*a*) or 104(*b*) is considered to be non-responsive. The GFI Notify application 125 may then send a notification to the user.

Method 401 may include notifying GFI Notify Account of a power status (step 414). UI 128 may notify the user as to power status via GFI Notify Account. For example, in response to receiving the power status sent from smart plug 104(*a*) or 104(*b*) to mobile device 126, the user may view GFI Notify Account on UI 128 and determine that a GFI circuit has tripped with the lack of communication from one smart plug 104(*a*), leading to a notification to GFI Notify Account. Thus, the GFI Notify application 125 is configured to provide a notice to a user via, for example, text, push notification, phone call, email, and or the like. In an example embodiment, the notification can be through a social media platform.

The smart plug application may be configured to provide one or more alerts to the user. The alert may be a notification, alarm, warning, or the like. The alert may be made by sending a text message, pop-up notification, email, phone call, social media message, or the like. The message may be text, graphics, alarms, sounds, or the like. The alert is configured to convey to the user that power is out to the electronic appliance connected to any outlet on the same GFI circuit as the smart plug. The alert may further note that the GFI circuit has tripped. The alert may identify the smart plug that is plugged into the tripped GFI circuit. The smart plug application may further receive input at set-up identifying the connected electronic appliance(s) to the set-up smart plug, and therefore the smart plug application may further identify the electronic appliance(s) that are connected to a tripped GFI circuit. The alert may also be used to trigger other actions to connected device such as alarms, sirens, chimes or the like to notify the user.

It is noted that the smart plug can be plugged into any outlet on the GFI circuit, not necessarily the same outlet as the appliance of concern (e.g., the fish tank or freezer).

These potential power loss/trip communications can be a specific query to the smart plug. For example, the power loss/trip communication can be a query to the smart plug or to the hub as to whether the smart plug has power. In another example embodiment, the power loss/trip communication can be any suitable communication that would typically generate a reply by the smart plug. The smart plug application may be configured to watch for a reply to the power/trip communication, and if the expected communication is not received, this may indicate a potential power loss/trip.

The smart plug application may be further configured to generate a follow up communication or additional follow up communications, in the event that an expected communication is not received. These follow up communications may occur in succession at any suitable interval to confirm, over a suitable period of time, that the plug is not communicating as would be expected if it were to have power. If the smart plug continues to not provide the expected reply to the follow up communication(s), the smart plug application may be configured to determine that a potential power loss/trip has occurred (or increase the certainty of that determination). Any suitable number of follow up communications may be made.

The user can associate a smart plug application with the smart plug. The smart plug application can be a manufacturer's application or a third party application. The smart plug application, in an example embodiment, may be suitably downloaded by the user onto their mobile device (e.g., smartphone). In another example embodiment, the smart plug application could be a web application accessed on a computer via the Internet.

In an example embodiment, a subset of the Internet is a Smart Things cloud ("cloud").

In various embodiments, the system further improves the functioning of the computer. For example, by the user's utilizing the smart plug application to communicate with the smart plug via Wi-Fi and/or with Bluetooth®, the user performs fewer computer functions and provides less input, which saves on data storage and memory which speeds processing. Additionally, by transmitting, storing, and accessing data using the processes described herein, the security of the data is improved, which decreases the risk of the computer or network from being compromised. For example, the system may implement an interface configured to communicate with a system to link the smart plug application and/or linked smart plugs to the user's address. The system may authenticate the user through a registration request authorization, such that the user does not need to continually re-submit registration requests, address data, and similar sensitive data. Decreasing the need for users to submit sensitive data may improve the security of the sensitive data, and may decrease the potential for security breaches, phishing attacks, and the like. IoT devices may be subject to hacking, and preventing sensitive data from security breaches is important to the security of a home and/or other building utilizing smart devices, including smart plugs.

In various embodiments, the smart plug application may be used via the mobile device to communicate with the hub via the cloud. The mobile device may be used to subscribe to notifications sent by the hub. The hub may determine when the smart plug loses power or is connected to a tripped GFI circuit. The hub may communicate via the cloud to the smart plug application. In another example embodiment, the smart plug application may externally communicate with the hub via a cloud server. A graphical user interface ("GUI") may be used within the smart plug application so that the user may access the cloud server. The GUI may be accessed on the mobile device. The user may manually input identifying information into the GUI to identify the smart plug. The completion of entering identifying information to the GUI may result in the smart plug syncing to the hub. The server may send back the status of the hub communication to the smart plug application. The user may view the status of the smart plug via the mobile device. If the hub recognizes that the smart plug loses power or is connected to a tripped GFI circuit, the hub may use its memory to send an email notification to the user via the cloud server.

In an example embodiment, any person whose cell phone number and email address have been entered into the application, and there can be multiple such entries possible, has the ability to receive the same smart plug notifications of power outage and power restoration.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the data may be distributed and/or accessed via a software enabled link, wherein the link may be sent via an email, text, post, social network input, and/or any other method known in the art.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Data Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

In various embodiments, the system and various components may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general data, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather data. For example, the smart digital assistant technologies may be used to interact with music, emails, texts, phone calls, question answering, home improvement data, smart home communication/activation, games, shopping, making to-do lists, setting alarms, streaming podcasts, playing audiobooks, and providing weather, traffic, and other real time data, such as news. The ALEXA®, GOOGLE HOME®, and HOMEPOD® systems may also allow the user to access data about eligible transaction accounts linked to an online account across all digital assistant-enabled devices.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying data derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit. The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data. In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system. The terms "computer program medium," "computer usable medium," and "computer readable medium" are used to generally refer to media such as removable storage drive and a hard disk installed in hard disk drive. These computer program products provide software to a computer system. The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods. It is noted that the network may be implemented as other types of networks, such as an interactive television (ITV) network. Moreover, the system contemplates the use, sale, or distribution of any goods, services, or data over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CS S), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server, any other application server components or may reside within another computing device or may take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN. 1) as in ISO/IEC 8824 and 8825; other proprietary techniques that may include fractal compression methods, image compression methods, etc.

In various embodiments, the ability to store a wide variety of data in different formats is facilitated by storing the data as a BLOB. Thus, any binary data can be stored in a storage space associated with a data set. As discussed above, the binary data may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different data that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey data useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific data related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing data such as commands, queries, files, data for storage, and the like in digital or any other form.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

Any communication, transmission, and/or channel discussed herein may include any system or method for delivering content (e.g. data, data, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

It should be understood that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described herein.

What is claimed is:

1. A method of outlet power outage detection, comprising:
 sending, by a remote processor, a power status inquiry to a smart plug;
 storing, by the remote processor, a power notification in a remote server, wherein the power notification is based on the power status inquiry to the smart plug;
 querying, by a smart plug application, the remote server for the power notification; and
 identifying, by the smart plug application, a power status of the smart plug based on the power notification.

2. The method of claim 1, wherein the power status is a loss of power to the smart plug.

3. The method of claim 1, further comprising:
 sending, by the smart plug application, a user notification based on the power status.

4. The method of claim 3, wherein the user notification is a text message sent to a user.

5. The method of claim 1, further comprising:
linking, by the smart plug application, the smart plug to a user account associated with the smart plug application.

6. The method of claim 1, wherein the power notification indicates whether or not the smart plug is receiving power.

7. The method of claim 1, further comprising:
authorizing, by the smart plug application, the smart plug.

8. The method of claim 1, further comprising:
identifying, by the smart plug application, a power restoration to the smart plug based on the power notification.

9. The method of claim 8, further comprising:
sending, by the smart plug application, a user notification based on the power status, wherein the user notification is a power restoration notification.

10. The method of claim 1, wherein the sending the power status inquiry to the smart plug is performed periodically.

11. An outlet power outage detection system comprising:
a remote processor;
a remote memory coupled to the remote processor, the remote memory having instructions allowing the remote processor to:
send a power status inquiry to a smart plug; and
store a power notification in a remote server, wherein the power notification is based on the power status inquiry to the smart plug; and
a smart plug application in communication with the remote memory, the smart plug application configured to:
query the remote server for the power notification; and
identify a power status of the smart plug based on the power notification.

12. The system of claim 11, wherein the power status is a loss of power to the smart plug.

13. The system of claim 11, wherein the smart plug application is further configured to:
send a user notification based on the power status.

14. The system of claim 13, wherein the user notification is a text message sent to a user.

15. The system of claim 11, wherein the smart plug application is further configured to:
link the smart plug to a user account associated with the smart plug application.

16. The system of claim 11, wherein the power notification indicates whether or not the smart plug is receiving power.

17. The system of claim 11, wherein the smart plug application is further configured to:
authorize the smart plug.

18. The system of claim 11, wherein the smart plug application is further configured to:
identify a power restoration to the smart plug based on the power notification.

19. The system of claim 18, wherein the smart plug application is further configured to:
send a user notification based on the power status, wherein the user notification is a power restoration notification.

20. The system of claim 11, wherein the sending the power status inquiry to the smart plug is performed periodically.

* * * * *